(12) United States Patent
Gong (10) Patent No.: US 10,370,021 B2
(45) Date of Patent: Aug. 6, 2019

(54) STEERING WHEEL

(71) Applicant: GUANGDONG HUA'CHAN RESEARCH INSTITUTE OF INTELLIGENT TRANSPORTATION SYSTEM CO., LTD, Shenzhen, Guangdong Province (CN)

(72) Inventor: Shugang Gong, Shenzhen (CN)

(73) Assignee: GUANGDONG HUA'CHAN RESEARCH INSTITUTE OF INTELLIGENT TRANSPORTATION SYSTEM CO., LTD, Shenzhen, Guangdong Province (CN)

(*) Notice: Subject to any disclaimer, the term of this patent is extended or adjusted under 35 U.S.C. 154(b) by 233 days.

(21) Appl. No.: 15/123,190

(22) PCT Filed: Mar. 11, 2014

(86) PCT No.: PCT/CN2014/073198
§ 371 (c)(1),
(2) Date: Sep. 1, 2016

(87) PCT Pub. No.: WO2015/135129
PCT Pub. Date: Sep. 17, 2015

(65) Prior Publication Data
US 2017/0072984 A1    Mar. 16, 2017

(51) Int. Cl.
*B62D 1/10* (2006.01)
*B60K 35/00* (2006.01)
(Continued)

(52) U.S. Cl.
CPC .............. *B62D 1/105* (2013.01); *B60K 35/00* (2013.01); *B60R 16/027* (2013.01);
(Continued)

(58) Field of Classification Search
CPC ........ B62D 1/105; B62D 1/046; B60R 16/027
See application file for complete search history.

(56) References Cited

U.S. PATENT DOCUMENTS 4,429,588 A * 2/1984 Emundts ................ B60K 37/02
280/775
4,771,650 A * 9/1988 Kerner ................ B60R 21/2032
280/731
(Continued)

FOREIGN PATENT DOCUMENTS

DE   102004059551 A1 * 6/2006 ............. B62D 1/105
DE   102007044797       4/2009
(Continued)

OTHER PUBLICATIONS

International Search Report of International Application No. PCT/CN2014/073198, dated Nov. 28, 2014, with both English and Chinese, total 4 pages.

*Primary Examiner* — Nicole T Verley
(74) *Attorney, Agent, or Firm* — Hamre, Schumann, Mueller & Larson, P.C.

(57) ABSTRACT

A steering wheel comprising a steering wheel rim (1) provided with an extended extremity (11), an operating part (2) provided on the radial inner side of the steering wheel rim (1), and an actuating rod (4) fixedly connected to the extended extremity (11). A central shaft (3) is extended from the bottom end of the operating part (2). The central shaft (3) runs through the extended extremity (11) and is inserted into a cavity provided by the actuating rod (4). A bearing component (5) is provided between the inner wall of the extended extremity (11) and the outer wall of the central shaft (3). By fitting the central shaft (3) with the bearing component (5), and by fitting the bearing component (5) with the extended extremity (11), separation of the operating part (2) and the steering wheel rim (1) is implemented, and the steering wheel rim (1) is allowed to be rotated around the
(Continued)

central shaft (3). The steering wheel has the operating part (2) and the steering wheel rim (1) arranged separately, when the steering wheel rim (1) is rotated, the operating part (2) does not rotate with the rotation of the steering wheel rim (1), thus ensuring that a driver can easily observe and control the operating part so as to improve the stability and safety of driving.

21 Claims, 6 Drawing Sheets

(51) Int. Cl.
    B60R 16/027     (2006.01)
    B60R 21/203     (2006.01)
    B62D 1/04     (2006.01)

(52) U.S. Cl.
    CPC ............ B60R 21/203 (2013.01); B62D 1/046 (2013.01); *B60K 2350/928* (2013.01)

(56) References Cited

U.S. PATENT DOCUMENTS

| | | | | |
|---|---|---|---|---|
| 5,072,628 | A | | 12/1991 | Oki |
| 5,152,358 | A | * | 10/1992 | Kozuka ................. B60K 35/00 |
| | | | | 180/78 |
| 6,264,235 | B1 | * | 7/2001 | Battermann ............ B60R 21/05 |
| | | | | 280/731 |
| 6,892,605 | B2 | * | 5/2005 | Menjak .................. B62D 1/105 |
| | | | | 180/402 |
| 7,677,131 | B2 | * | 3/2010 | Chapelain ............. B62D 1/105 |
| | | | | 74/409 |
| 7,931,296 | B2 | * | 4/2011 | Choi ................... B60R 21/2032 |
| | | | | 280/728.2 |
| 2002/0121153 | A1 | * | 9/2002 | Hoblingre ........... B60R 21/2032 |
| | | | | 74/492 |
| 2008/0315564 | A1 | * | 12/2008 | Muller ................... B60Q 5/003 |
| | | | | 280/728.2 |

FOREIGN PATENT DOCUMENTS

| | | | | | |
|---|---|---|---|---|---|
| DE | 102007044797 | A1 | * | 4/2009 | ............. B60K 35/00 |
| FR | 2720709 | | | 12/1995 | |
| FR | 2836665 | A1 | * | 9/2003 | ............. B62D 1/105 |
| JP | S61155038 | | | 7/1986 | |
| JP | 01148640 | A | * | 6/1989 | ............. B62D 1/105 |
| WO | WO-2006081812 | A1 | * | 8/2006 | ......... B60R 21/2035 |

\* cited by examiner

STEERING WHEEL

FIELD OF THE INVENTION

The present application relates to the technical field of automobile components, especially to a steering wheel used in an automobile.

BACKGROUND OF THE INVENTION

In recent years, with the high-functionalization of automobiles and the increase and multi-functionalization of on-board equipments, there exists an increasing trend of operating mechanisms arranged inside an automobile, such as keys or switches. Therefore, a controlling mechanism of the aforesaid on-board equipments is mounted on a front side of a steering wheel configured to steer and control; wherein the front side is opposite to a driver.

As the prior art of the aforesaid steering wheel, the following steering wheeling is provided. The steering wheeling comprises: a steering wheel rim in a substantially annular shape, a lug boss arranged at a center of a radial inner side of the steering wheel rim, a plurality of spoke parts arranged between the lug boss and the steering wheel rim, and an operating part arranged on a front side of the lug boss and the spoke parts.

In the steering wheel of the prior art, the operating part and the plane including the steering wheel rim are substantially arranged in the same plane, that is, the heights of the steering wheel rim and the operating part along the axial direction of the steering shaft are substantially identical. In such a steering wheel formed by a steering wheel rim and an operating part substantially positioned in the same plane, when the driver is holding the steering wheel rim and performing a steering operation, the operating part will be rotated along with the steering wheel rim, such that the driver is unable to see the functional keys on the operating part easily and clearly, and thus is unable to control each function key on the operation part timely and effectively, even faulty operations to the functional keys on the operating part are prone to occur, which seriously affects the steady and safety of the driving operation of automobiles.

SUMMARY OF THE INVENTION

A purpose of the invention is to provide steering wheel used in an automobile, and aims to overcome the problem in the prior art that in a common automobile steering wheel, the operating part and the steering wheel rim are integrally arranged; when a driver rotates the steering wheel rim, the operating part will be rotated along with the steering wheel rim, thereby making the driver be unable to observe and control the operating part easily, and thus affecting the driving stability and safety.

The application provides the following technical solution: a steering wheel applied in an automobile and including a steering wheel rim with an extended extremity protruding outwards along a mounting center, an operating part arranged on the radial inner side of the steering wheel rim, and an actuating rod fixedly connected to the extended extremity; a central shaft extends from the bottom of the operating part; the central shaft runs through the extended extremity and is inserted into a cavity of the actuating rod; a bearing component is arranged between an inner wall of the extended extremity and an outer wall of the central shaft; by fitting the central shaft with the bearing component and fitting the bearing component with the extended extremity, the isolation between the operating part and the steering wheel rim is achieved, and the steering wheel rim may be rotated around the central shaft.

Specifically, the operating part includes a panel and a supporting element supporting the panel; the supporting element is provided with a connecting end fitting with the central shaft; the supporting element is arranged between the panel and the steering wheel rim; and the supporting element is fixedly connected to the panel.

Furthermore, the operating part further includes a control circuit board arranged in a cavity formed by the panel and the steering wheel rim, a plurality of control keys arranged on the panel and electrically connected to the control circuit board, and an instrumental display.

Preferably, an airbag component configured to protect the safety of a driver is arranged between the panel and the supporting element.

Furthermore, the central shaft is provided with a receiving end fitting with the supporting element; the receiving end is fixedly connected to the connecting end.

Preferably, the actuating rod runs through and protrudes from the extended extremity; a top end of the actuating rod is fixedly connected to the steering wheel rim through the connecting part.

Furthermore, the bearing component includes a cage ring sheathed around the periphery of the central shaft and a pair of bearings; the pair of bearings are isolated from each other by the cage ring.

Furthermore, an edge of an outer end of the extended extremity bends along a radial inner side of the extended extremity, and extends inwards to form a step for bearing the bearing component.

Preferably, a hollow transmission link rod is inserted in a cavity of the actuating rod, and the central shaft is inserted in a cavity of the transmission link rod.

Furthermore, both an inner wall of the cavity of the actuating rod and an outer wall of the transmission link rod are provided with spline grooves; splines are arranged in the spline grooves correspondingly; by fitting the splines with the spline grooves, axial sliding of the transmission link rod in the cavity of the actuating rod is achieved.

Compared with the prior art, the invention provides a steering wheel applied in an automobile, of which an operating part and a steering wheel rim are arranged to be isolated from each other and fixed independently. When the steering wheel rim is rotated, the operating part will not be rotated along with the steering wheel rim, such that it is ensured that the driver may observe and control the operating part easily and the drive is more stable and safe.

DETAILED DESCRIPTION OF THE PREFERRED EMBODIMENT

In order to make the purposes, technical solutions, and advantages of the present application more clear, the present application will be further described in detail hereinafter with reference to accompanying drawings and embodiments. It should be understood that the specific embodiments described herein are merely intended to explain but not to limit the present application.

The implementation of the present application will be described in detail hereinafter with reference to the following specific embodiments.

Figure 1:
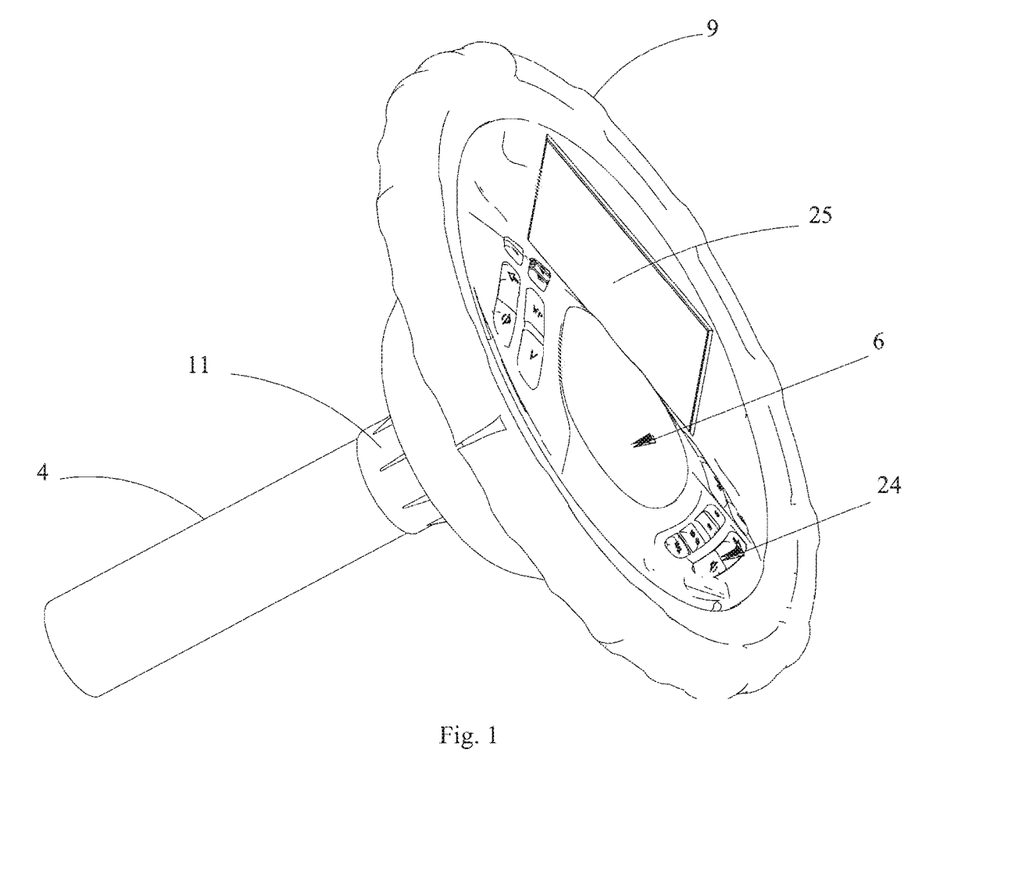
FIG. 1 is a perspective schematic view of a steering wheel provided by an embodiment of the present application.
Figure 2:
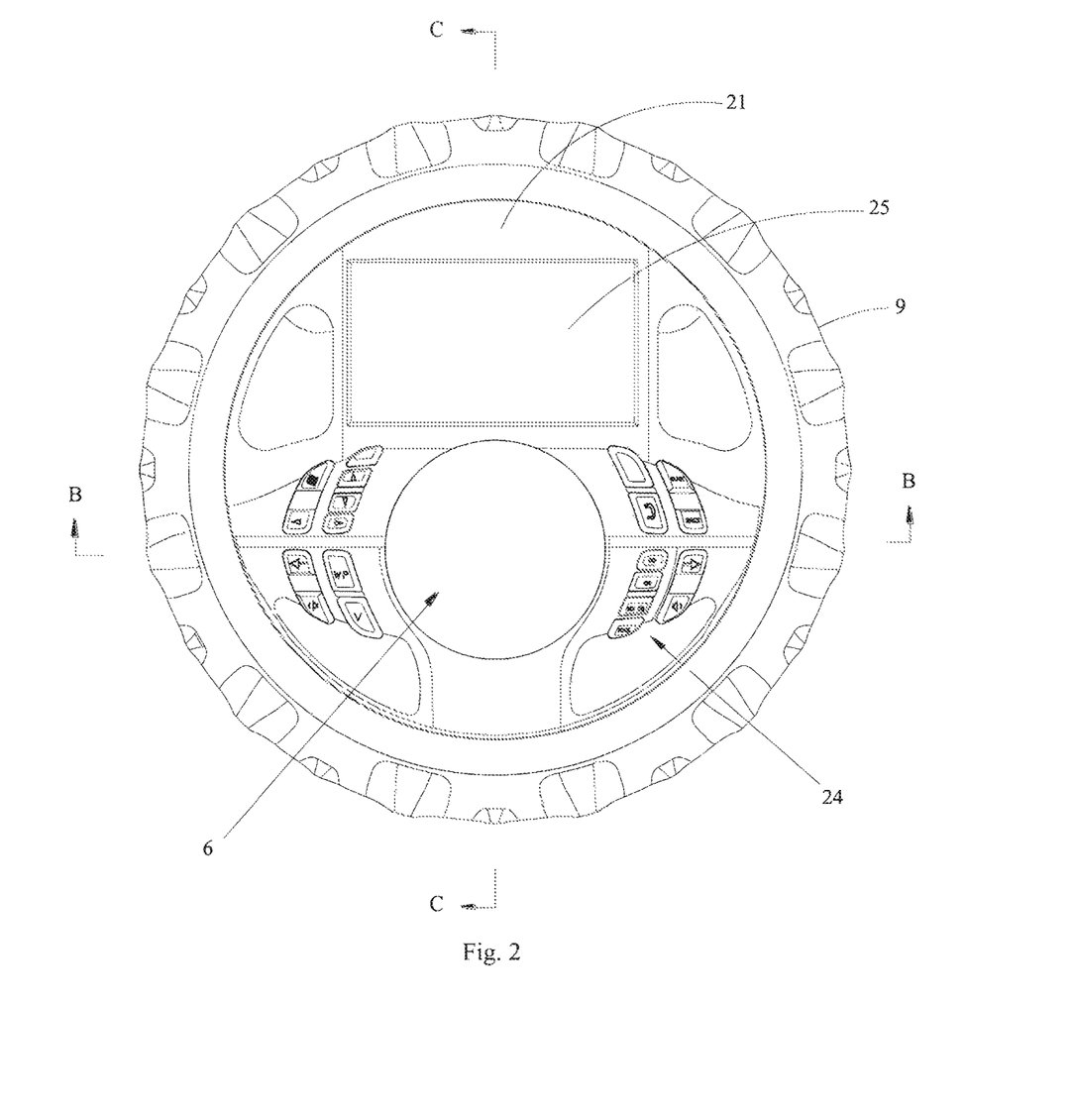
FIG. 2 is a top schematic view of a steering wheel provided by the embodiment of the present application.
Figure 3:
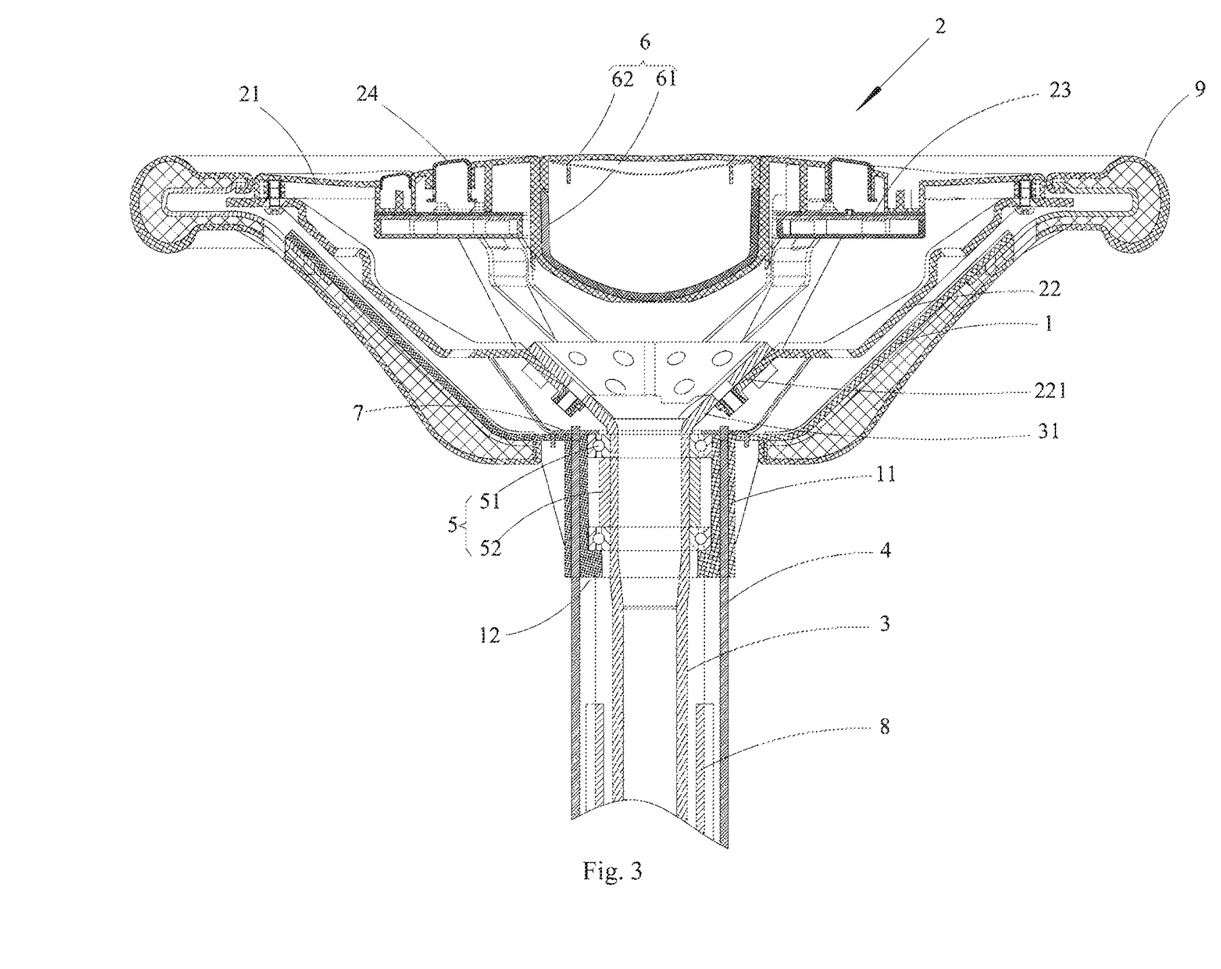
FIG. 3 is a sectional schematic view along the B-B direction shown in FIG. 2.
Figure 4:
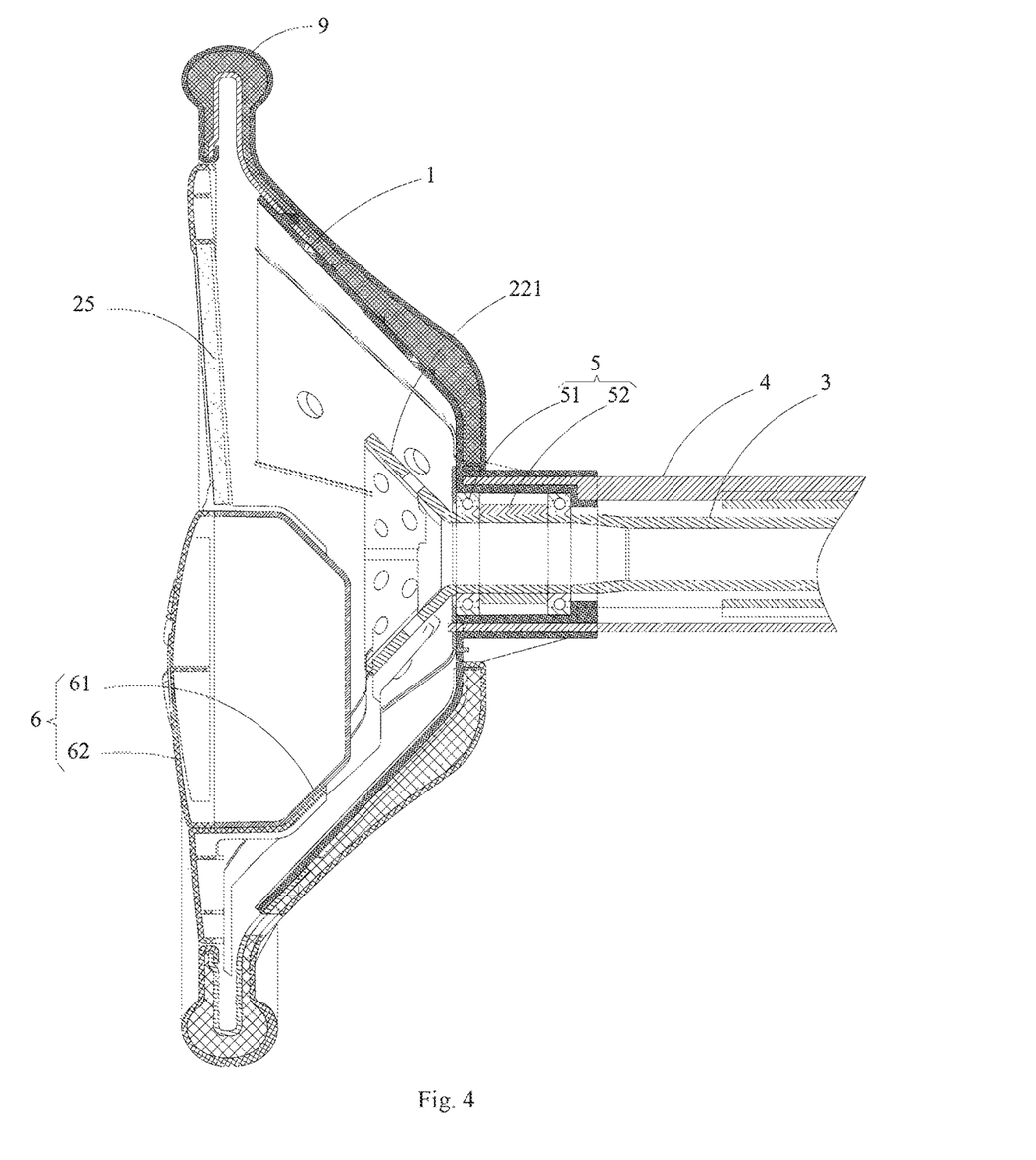
FIG. 4 is a sectional schematic view along the C-C direction shown FIG. 2.
Figure 5:
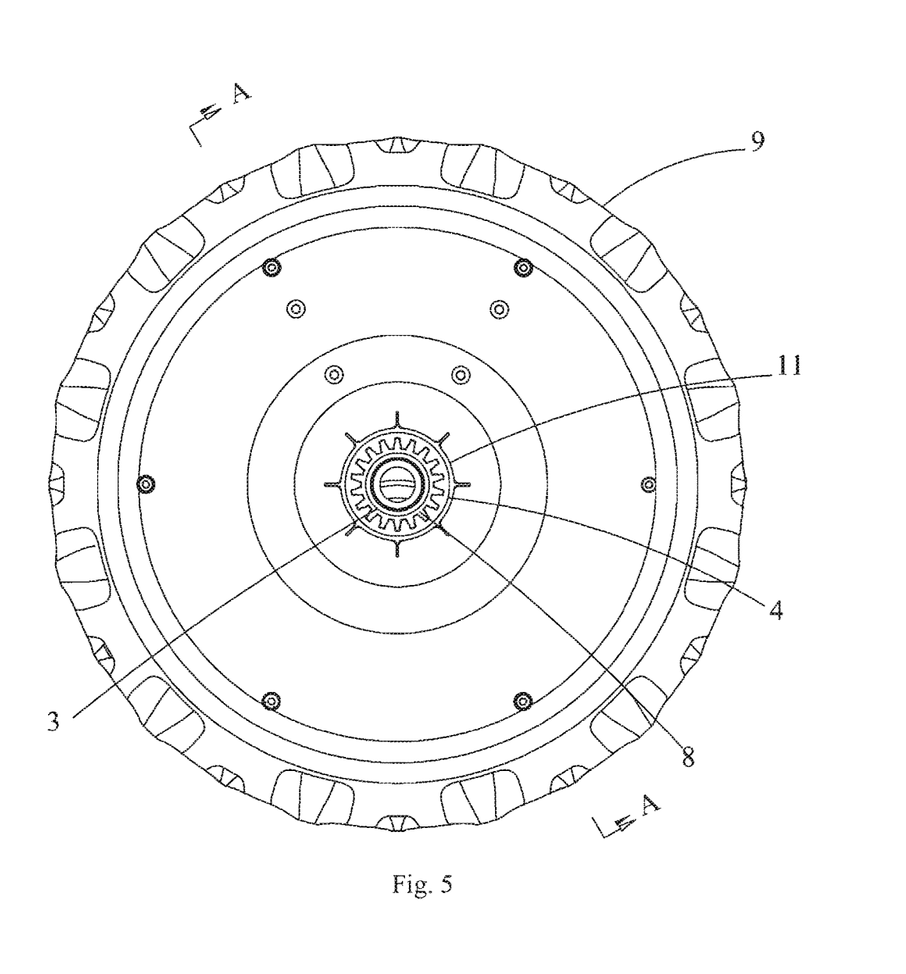
FIG. 5 is a bottom schematic view of a steering wheel provided by the embodiment of the present application.
Figure 6:
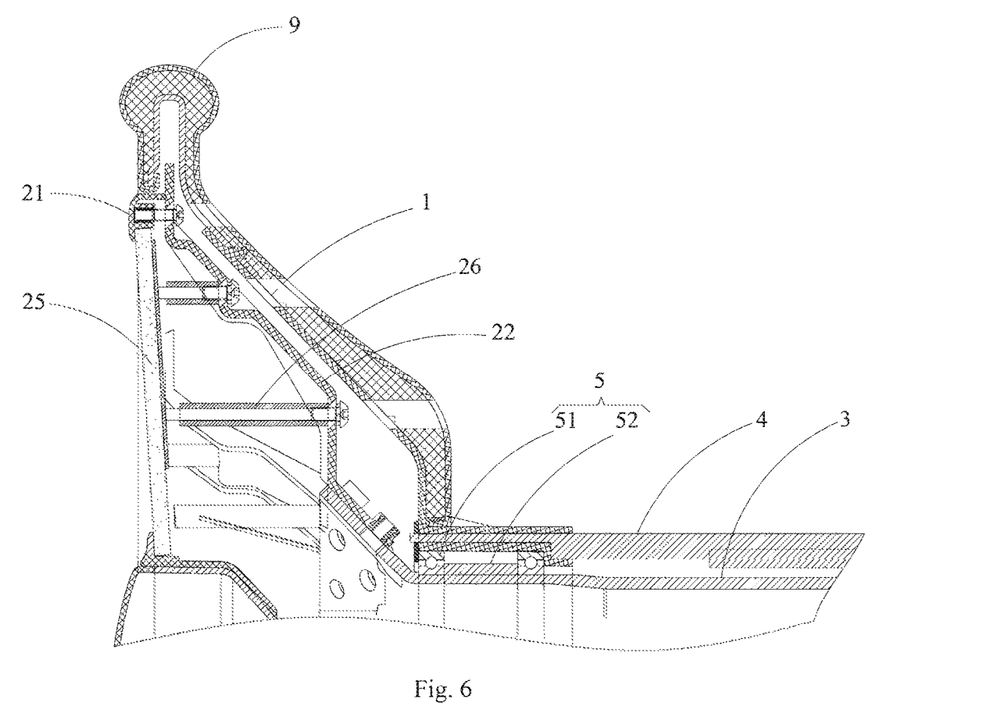
FIG. 6 is a sectional schematic view along the A-A direction shown in FIG. 5.

As shown in FIGS. 1-6, a preferred embodiment of the application is provided.

A steering wheel provided by this embodiment is applied in automobiles. The steering wheel includes a steering wheel rim 1, an operating part 2, a central shaft 3, and an actuating rod 4, wherein an extended extremity 11 configured for connection is formed by extending downwards from a central line of the steering wheel rim 1; the extended extremity 11 is in a tube shape, one end of the actuating rod 4 is inserted in and fixedly connected to the extended extremity 11, and cavities inside the actuating rod 4 and the extended extremity 11 are communicated; furthermore, the operating part 2 is arranged on a radial inner side of the steering wheel rim 1; one end of the central shaft 3 is fixedly connected to a center of a bottom end of the operating part 2, and the other end of the central shaft 3 runs through the extended extremity 11 and is inserted into a cavity of the actuating rod 4. Furthermore, a bearing component 5 is arranged between an inner wall of the extended extremity 11 and an outer wall of the central shaft 3. The central shaft 3 is separated from the actuating rod 4 by the bearing component 5, and thus the separation between the operating part 2 and the steering wheel rim 1 is achieved. Furthermore, through the bearing component 5, the steering wheel rim 1 can be rotated axially around the central shaft 3. Naturally, when the driver rotates the steering wheel rim 1, the operating part 2 and the central shaft 3 will keep a still status relative to the driver, that is, the operating part 2 will not be rotated along with the rotation of the steering wheel rim 1.

Utilizing the aforesaid steering wheel in an automobile is characterized in that:

The steering wheel of this embodiment fixes the operating part 2 and the central shaft 3 together, and arranges the operating part 2 and the central shaft 3 together with the steering wheel rim 1 and the actuating rod 4. Meanwhile, the central shaft 3 is separated from the actuating rod 4 by the bearing component 5, so that the separation between the operating part 2 and the steering wheel rim 1 is achieved; when a driver rotates the steering wheel rim 1, he/she can easily observe and control the operating part 2 which is still relative to the driver, thereby ensuring the driving stability and safety.

In this embodiment, the operating part 2 includes a panel 21 and a supporting element 22 fixedly connected to the panel 21. The supporting element 22 is configured to support and hold up the panel 21, and the supporting element 22 is arranged in a cavity formed by the panel 21 and the steering wheel rim 1; furthermore, a connecting end 221 configured to fixedly connect the central shaft 3 is arranged along a central line at the bottom end of the supporting element 22; the connecting end 221 is provided with a through-hole aligned with the extended extremity 11. The central shaft 3 runs through the through-hole in the connecting end 221 and the extended extremity 11 successively, and is inserted into the cavity of the actuating rod 4.

The operating part 2 further includes a control circuit board 23, a control key 24 and an instrumental display 25; wherein the control circuit board 23 is fixedly arranged in a cavity formed by the panel 21 and the supporting element 22, the control key 24 is electrically connected to the control circuit board 23 and protrudes from a surface of the panel 21. Herein, there are a plurality of control keys 24 which respectively control a plurality of devices in the automobile; the instrumental display 25 is fixedly arranged on the panel 21, and the instrumental display 25 is electrically connected to the control circuit board 23. Furthermore, a lower part of the instrumental display 25 is provided with a holder 26 configured to hold the instrumental display 25. One end of the holder 26 holds up the instrumental display 25, and the other end of the holder 26 is fixedly connected to the supporting element 22. Surely, in other embodiments, the instrumental display 25 can also be fixed to the panel 21 by other ways.

In this embodiment, the instrumental display 25 may be a 7-inch liquid crystal display; herein, the instrumental display 25 may also adopt other sizes; the control key 24 includes display control keys, phone control keys, and control keys for an automobile lamp, a speaker and a wiper, which are specifically a main menu display key, left and right direction keys, up and down direction keys, enter and exit keys, left and right turn lamp control keys, left and right speaker control keys, control keys for big and small lamps, control keys for dipped and bean lamps, a driving lamp control key, a wiper on-off control key, a three-gear speed-control wiper speed control key, and phone answer or hang-up keys, and so one. Naturally, integrating controls for various devices on the operating part 2 meets the driver's utility requirements of operating the automobile conveniently and quickly, and makes the function of the steering wheel be more personalized.

In order to further ensure the personal safety of the driver, the operating part 2 is further provided with an airbag component 6, the airbag component 6 includes a safety airbag 61 and an airbag cap 62. A side surface of the panel 21 of the operating part 2 faces against an inner surface of the supporting element 22, and recesses to form a containing slot. The safety airbag 61 is arranged in the containing slot, and the airbag cap 62 covers an opening of the containing slot, thereby enveloping the safety airbag 61 in the operating part 2. When the automobile suffers a fierce crash, the safety airbag 61 will inflate automatically and instantly, break through the airbag cap 62 and bulge, thereby forming a cushion protection to the upper body and the head of the driver.

An upper end of the central shaft 3 is provided with a funnel-shaped receiving end 31. A straight-axis portion at the lower end of the central shaft 3 runs through the through-hole of the connecting end 221 at the lower end of the supporting element 22, and an outer wall of the receiving end 31 abuts the inner wall of the connecting end 221; furthermore, the receiving end 31 and the connecting end 221 are locked and secured by a bolt. Surely, in other embodiments, the receiving end 31 and the connecting end 221 can be structures in other manners, and can also be fixedly connected by other ways.

In the embodiment, an upper end of the actuating rod 4 runs through an extended extremity 11 of the steering wheel rim 1 and protrudes from the extended extremity 11. A protruding part at the upper end of the actuating rod 4 is fixedly connected to the steering wheel rim 1 through a connecting part 7. Herein, the connecting part 7 is in a disk shape, and a center of the connecting part 7 is provided with a circular hole for the central shaft 3 to run through; a circumferential edge of the connecting part 7 is bent downwards and runs through the steering wheel rim 1, and then further bent along a radial internal side of the connecting part 7 to abut an outer wall of the steering wheel rim 1. Meanwhile, the protruding part at the upper end of the actuating rod 4 is riveted to an upper surface of the connecting part 7, and thus a tight connection between the actuating rod 4 and the steering wheel rim 1 is achieved. Surely, in other embodiments, the tight connection between actuating rod 4 and the steering wheel rim 1 can be achieved by other ways.

The bearing component 5 includes a pair of bearings 51 and a cage ring 52; in this embodiment, the bearings 51 are deep groove ball bearings; other bearings can be adopted as the bearings 51 too. The pair of bearings 51 and the cage ring 52 are all sheathed on the periphery of the central shaft 3 located inside a cavity of the extended extremity 11, and the pair of bearings 51 are separately arranged at the upper side and lower side of the cage ring 52, forming an interval therebetween. Hence, by the arrangement of the bearing component 5, the actuating rod 4 can be rotated relative to the central shaft 3 independently without interfering with the central shaft 3. Surely, in other embodiments, the bearing component 5 may adopt more bearings 51 and cage rings 52 according to actual conditions and requirements.

In order to prevent the bearing component 5 from generating any axial displacement in the cavity of the extended extremity 11, an edge of an outer end of the extended extremity 11 is bent along the radial inner side of the extended extremity 11, and extends inwards to form a step 12. The step 12 is used to bear the bearing component 5 and prevent the bearing component 5 from sliding downward along the axial direction of the central shaft 3. Meanwhile, a lower surface of the connecting part 7 stops the upward displacement of the hearing component 5, thus the bearing component 5 is completely confined in the cavity of the extended extremity 11.

In order to meet the requirements of a driver for different heights to a steering wheel, a transmission link rod 8 is inserted in a cavity of the actuating rod 4. The transmission link rod 8 may perform a concertina movement inside the cavity of the actuating rod 4; the concertina distance is 0~85 mm. Surely, the concertina distance can be adjusted according to actual conditions and requirements. Thus, the driver may adjust the height of the steering wheel according to requirements, such that the operation of the steering wheel is more personalized. Furthermore, the steering wheel in this embodiment can perform 0°~16° swings forward and backward, with using the central shaft 3 as a radius, which does not need to be described in detail herein. In this embodiment, the transmission link rod 8 is a hollow rod-shaped structure; the central shaft 3 can also be inserted in the cavity of the transmission link rod 8, and the central shaft 3 and the transmission link rod 8 can keep being isolated from each other.

Specifically, both an outer wall of the transmission link rod 8 and an inner wall of the actuating rod 4 are provided with spline grooves; splines are provided in the spline grooves. Thus, the transmission link rod 8 can slide along the axial direction of the actuating rod 4 in the cavity of the actuating rod 4. In this embodiment, the transmission link rod 8 is a spline shaft, however, this is not a limitation to the application.

In this embodiment, both the actuating rod 4 and the transmission link rod 8 are made of aluminum; both the operating part 2 and the steering wheel rim 1 are made of plastics with high intensity, which reduces the weight of the steering wheel effectively and makes the steering wheel be more light and flexible to operate. Furthermore, through a processing procedure including foaming and wrapping, an external ring of the steering wheel rim 1 forms a gripping part 9 of the steering wheel. At the same time, according to ergonomics, the gripping part 9 is additionally provided with embossments, so that the driver will feel more comfortable when gripping the gripping part 9.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A steering wheel, applied in an automobile, and comprising:
    a steering wheel rim with an extended extremity protruding outwards along a mounting center;
    an operating part arranged on a radial inner side of the steering wheel rim; and
    an actuating rod fixedly connected to the extended extremity,
    wherein a central shaft extends from a bottom of the operating part, the central shaft runs through the extended extremity and is inserted into a cavity of the actuating rod, a bearing component is arranged between an inner wall of the extended extremity and an outer wall of the central shaft, and by fitting the central shaft with the bearing component and fitting the bearing component with the extended extremity, an isolation between the operating part and the steering wheel rim is achieved, the steering wheel rim being rotatable around the central shaft, and
    wherein the bearing component includes a cage ring sheathed around periphery of the central shaft and a pair of bearings, the pair of bearings isolated from each other by the cage ring.

2. The steering wheel of claim 1, wherein the operating part includes a panel and a supporting element supporting the panel, the supporting element provided with a connecting end fitting with the central shaft, the supporting element arranged between the panel and the steering wheel rim, and the supporting element fixedly connected to the panel.

3. The steering wheel of claim 2, wherein the operating part further includes a control circuit board arranged in a cavity formed by the panel and the steering wheel rim, a plurality of control keys arranged on the panel and electrically connected to the control circuit board, and an instrumental display.

4. The steering wheel of claim 2, wherein an airbag component configured to protect safety of a driver is arranged between the panel and the supporting element.

5. The steering wheel of claim 2, wherein the central shaft is provided with a receiving end fitting with the supporting element, the receiving end is fixedly connected to the connecting end.

6. The steering wheel of claim 1, wherein an edge of an outer end of the extended extremity bends along a radial inner side of the extended extremity, and extends inwards to form a step for bearing the bearing component.

7. The steering wheel of claim 1, wherein a hollow transmission link rod is inserted in a cavity of the actuating rod, and the central shaft is inserted in a cavity of the transmission link rod.

8. The steering wheel of claim 7, wherein both an inner wall of the cavity of the actuating rod and an outer wall of the transmission link rod are provided with spline grooves, splines arranged in the spline grooves correspondingly, and by fitting the splines with the spline grooves, axial sliding of the transmission link rod in the cavity of the actuating rod is achieved.

9. The steering wheel of claim 3, wherein an airbag component configured to protect safety of a driver is arranged between the panel and the supporting element.

10. The steering wheel of claim 3, wherein the central shaft is provided with a receiving end fitting with the supporting element, the receiving end fixedly connected to the connecting end.

11. The steering wheel of claim 4, wherein the central shaft is provided with a receiving end fitting with the supporting element, the receiving end fixedly connected to the connecting end.

12. A steering wheel, applied in an automobile, and comprising:
   a steering wheel rim with an extended extremity protruding outwards along a mounting center;
   an operating part arranged on a radial inner side of the steering wheel rim; and
   an actuating rod fixedly connected to the extended extremity,
   wherein a central shaft extends from a bottom of the operating part, the central shaft runs through the extended extremity and is inserted into a cavity of the actuating rod, a bearing component is arranged between an inner wall of the extended extremity and an outer wall of the central shaft, and by fitting the central shaft with the bearing component and fitting the bearing component with the extended extremity, an isolation between the operating part and the steering wheel rim is achieved, the steering wheel rim being rotatable around the central shaft, and
   wherein the actuating rod runs through and protrudes from the extended extremity, a top end of the actuating rod fixedly connected to the steering wheel rim through a connecting part, and
   wherein the bearing component includes a cage ring sheathed around a periphery of the central shaft and a pair of bearings, the pair of bearings isolated from each other by the cage ring.

13. The steering wheel of claim 12, wherein the operating part includes a panel and a supporting element supporting the panel, the supporting element provided with a connecting end fitting with the central shaft, the supporting element arranged between the panel and the steering wheel rim, and the supporting element fixedly connected to the panel.

14. The steering wheel of claim 13, wherein the operating part further includes a control circuit board arranged in a cavity formed by the panel and the steering wheel rim, a plurality of control keys arranged on the panel and electrically connected to the control circuit board, and an instrumental display.

15. The steering wheel of claim 13, wherein an airbag component configured to protect safety of a driver is arranged between the panel and the supporting element.

16. The steering wheel of claim 13, wherein the central shaft is provided with a receiving end fitting with the supporting element, the receiving end fixedly connected to the connecting end.

17. The steering wheel of claim 12, wherein a hollow transmission link rod is inserted in a cavity of the actuating rod, and the central shaft is inserted in a cavity of the transmission link rod.

18. The steering wheel of claim 17, wherein both an inner wall of the cavity of the actuating rod and an outer wall of the transmission link rod are provided with spline grooves, splines arranged in the spline grooves correspondingly, and by fitting the splines with the spline grooves, axial sliding of the transmission link rod in the cavity of the actuating rod is achieved.

19. The steering wheel of claim 14, wherein an airbag component configured to protect safety of a driver is arranged between the panel and the supporting element.

20. The steering wheel of claim 14, wherein the central shaft is provided with a receiving end fitting with the supporting element, the receiving end fixedly connected to the connecting end.

21. The steering wheel of claim 15, wherein the central shaft is provided with a receiving end fitting with the supporting element, the receiving end fixedly connected to the connecting end.

* * * * *